United States Patent [19]

Kasahara et al.

[11] Patent Number: 4,602,159
[45] Date of Patent: Jul. 22, 1986

[54] INFRARED DETECTOR

[75] Inventors: Yukio Kasahara, Tokyo; Ritsuo Inaba, Hirakata, both of Japan

[73] Assignee: Matsushita Electric Industrial Co., Ltd., Osaka, Japan

[21] Appl. No.: 606,775
[22] PCT Filed: Aug. 10, 1983
[86] PCT No.: PCT/JP83/00259
§ 371 Date: Apr. 9, 1984
§ 102(e) Date: Apr. 9, 1984
[87] PCT Pub. No.: WO84/00812
PCT Pub. Date: Mar. 1, 1984

[30] Foreign Application Priority Data

Aug. 10, 1982 [JP] Japan .................................. 57-139419
Dec. 22, 1982 [JP] Japan .................................. 57-223871

[51] Int. Cl.⁴ .................................................. G01J 5/62
[52] U.S. Cl. ..................................... 250/338; 250/349; 250/350; 250/351; 331/66
[58] Field of Search ............ 250/351, 350, 349, 338 R, 250/338 FE; 374/120, 121, 170, 188; 310/319, 315, 314, 311; 331/66

[56] References Cited

U.S. PATENT DOCUMENTS

| | | | |
|---|---|---|---|
| 3,457,412 | 7/1969 | Cary | 250/351 |
| 3,879,992 | 4/1975 | Bartera | 73/30 |
| 4,023,088 | 5/1977 | Fowler | 322/2 R |
| 4,197,530 | 4/1980 | Laue | 340/602 |
| 4,209,725 | 6/1980 | Dieulesaint et al. | 310/313 |

FOREIGN PATENT DOCUMENTS

| | | |
|---|---|---|
| 47-24628 | 7/1972 | Japan . |
| 58-113822 | 7/1983 | Japan . |
| 922534 | 4/1982 | U.S.S.R. .............................. 374/170 |

*Primary Examiner*—Craig E. Church
*Assistant Examiner*—Constantine Hannaher
*Attorney, Agent, or Firm*—Spencer & Frank

[57] ABSTRACT

In an infrared detector, a shutter is employed in an elastic wave element of a feedback type of oscillator containing the elastic element so that the elastic element receives infrared light intermittently. The period during which the number of peaks of the oscillation output waveform from the oscillator exceeds a predetermined value is set to be the opening or closing period of the shutter, the number of clock pulses from a clock signal generator is counted during the shutter opening or closing period, and the difference between the counted values is obtained, thereby detecting the energy of the infrared light. This detector features not only an extremely high sensitivity, but a high detection accuracy, as well as the production of a digital output.

3 Claims, 13 Drawing Figures

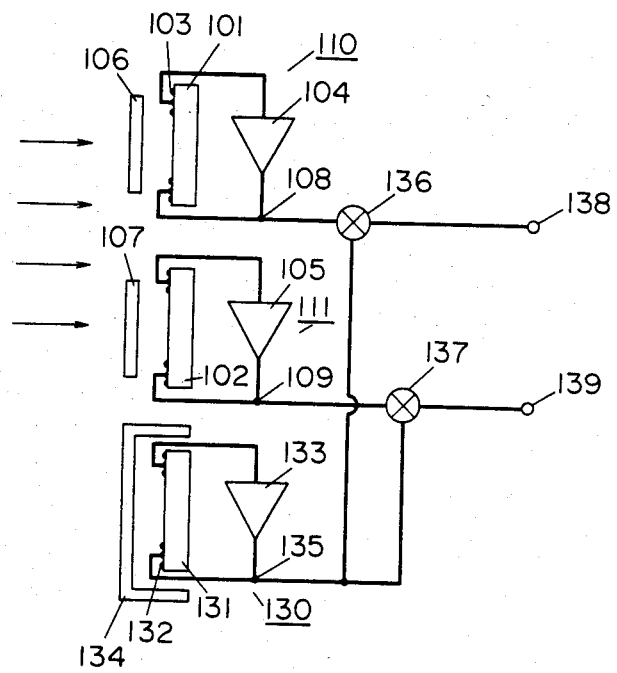

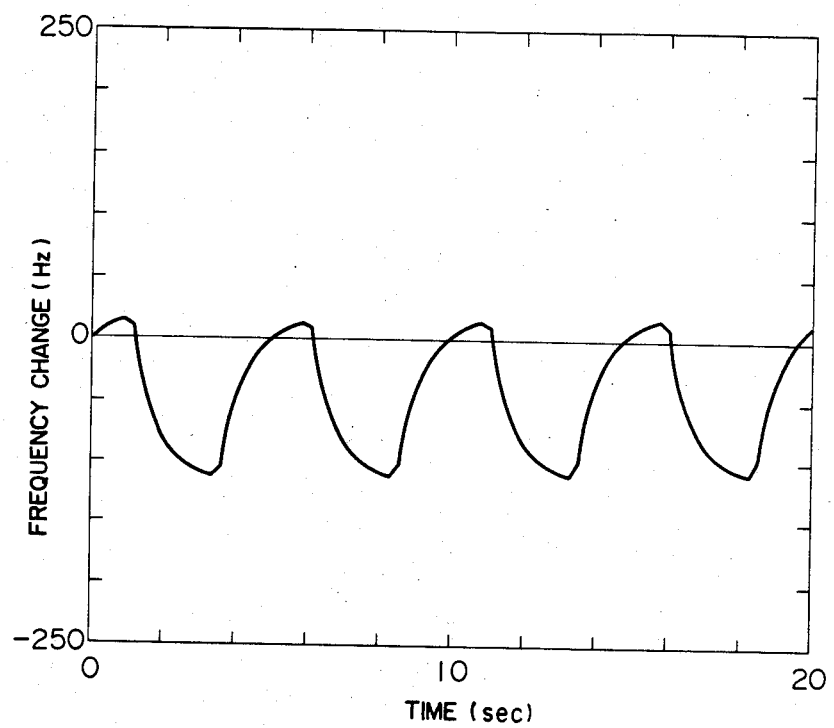

INFRARED DETECTOR

TECHNICAL FIELD

The present invention relates to an infrared detector.

BACKGROUND OF THE INVENTION

Conventionally, as an infrared detector, either a thermal type or photo type has been used. Of these types, for measurement of temperatures in living space, the thermal type detector is used which is of relatively high sensitivity in a wavelength range of 5 μm or more and is inexpensive. Typically available as the thermal type detector is a pyroelectric type element which is used for an electronic oven, crime prevention and the like. In addition, a thermistor bolometer, a thermopile and the like are available. All of these devices or elements, however, provide analog outputs and have unsatisfactory noise-proof properties. Therefore, the advent of an infrared detector having digital outputs has been desired.

With the development of microcomputers, on the other hand, the advent of an element has been desired which is capable of directly inputting digital signals to a microcomputer.

SUMMARY OF THE INVENTION

An object of the present invention is to provide a thermal type infrared detector which has digital output signals for satisfying these requirements and which is of high sensitivity and low cost.

The infrared detector of the present invention makes use of the fact that when infrared rays are irradiated on an elastic surface wave propagation path of an elastic surface wave propagation member in an elastic surface wave oscillator, the oscillation frequency changes in accordance with the intensity of the infrared rays.

BRIEF DESCRIPTION OF THE DRAWINGS

FIG. 12 is a diagram showing still another specified example of the present invention, and FIG. 13 is a diagram showing an example of an actual measurement according to the example shown in FIG. 12.

DESCRIPTION OF THE PREFERRED EMBODIMENTS

Figure 1:
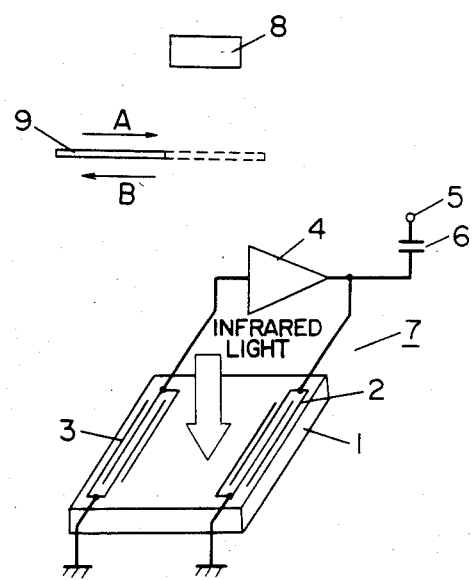
FIG. 1 is a schematic diagram of an infrared detecting unit used in an infrared detector according to the present invention.

The principle of an infrared detector of the present invention will first be described. FIG. 1 shows a construction of an infrared detecting unit used in the infrared detector of the present invention. In the figure, numeral 1 denotes a piezoelectric substrate made of, for example, lithium niobate, and numerals 2 and 3 denote interdigital electrodes for elastic wave transmission and for elastic wave reception, respectively, which are formed on a polished surface of the piezoelectric substrate 1 through vapor deposition, for example. One terminal of each of the elastic wave transmission interdigital electrode 2 and elastic wave reception interdigital electrode 3 is grounded and the other terminal thereof is connected to an output side and an input side of amplifier 4, respectively. Numeral 5 denotes an output terminal connected to the output side of the amplifier 4 via a capacitor 6.

As described above, a feedback type oscillator 7 is constructed.

Numeral 8 denotes an object to be detected which emits infrared light, and 9 a shutter interposed between the object 8 and the oscillator 7. The shutter 9 is movably arranged and driven by a drive means (not shown) such as a solenoid in the directions of arrows A and B, thereby playing the role of interrupting the infrared light from the object 8 and preventing it from reaching the oscillator 7 when the shutter 9 is positioned as shown at the dotted line. As the shutter 9 moves in the direction of arrow B so that the infrared light is irradiated on an elastic wave propagation surface of the piezoelectric substrate 1, temperature of the piezoelectric substrate 1 the rises. For example, infrared light emitted from an object 8 to be detected at a temperature of 70° C. which is distant 7 cm from the surface of the piezoelectric substrate 1 causes a temperature rise of about 1/1000° C. in the piezoelectric substrate 1. This slight temperature rise of 1/1000° C. is a quantity which is difficult to measure by ordinary thermal expansion measurement, for example.

The present invention intends to detect, with a high sensitivity, this slight temperature rise by utilizing changes in elastic constants of the piezoelectric substrate 1. More specifically, this temperature rise causes the velocity of the elastic wave propagating along the surface of the piezoelectric substrate 1 to change, and a resulting velocity change of the elastic wave causes the phase of the elastic wave propagating between the elastic wave transmission and reception interdigital electrodes 2 and 3 to change when the elastic wave reaches the elastic wave reception interdigital electrode 3. The output frequency of the oscillator 7 changes in accordance with the resulting phase change, and a resulting frequency is taken out of the output terminal 5 via the capacitor 6. The frequency change was about 700 Hz when, for example, the object 8 at 70° C. was a distance of 7 cm from the oscillator 7 and the output frequency of the oscillator 7 was set to 171 MHz. The frequency change increases in proportion to an increase in the frequency of the oscillator 7 and an increase in the temperature coefficient of the piezoelectric substrate 1 and it is calculated from the following equation. More specifically, the frequency change, $\Delta f$, is given by, $$\Delta f = \frac{1}{3} \alpha v \cdot f \cdot \frac{Ql^2}{K} \quad (1)$$

where $\alpha v$ represents the temperature coefficient of the piezoelectric substrate 1, f the oscillation frequency of the oscillator 7, K the thermal conductivity of the piezoelectric substrate 1, l half the distance between the elastic wave transmission and reception interdigital electrodes 2 and 3, and Q the energy of the infrared light imparted to the piezoelectric substrate 1. According to equation (1), with a piezoelectric substrate 1 having large $\alpha v$, f, Q and l and small K, the frequency change due to irradiation of the infrared light becomes large. In this case, the higher the temperature of the object 8 emitting infrared light irradiated on the piezoelectric substrate 1, the more the frequency change increases. Conversely, energy of infrared light from an object 8 to be detected at approximately the same temperature as the piezoelectric substrate 1 is small and the frequency change becomes small, making it difficult to detect the temperature change. This corresponds to such an exemplary case wherein temperature of a human body (about 30° C.) is desired to be detected at room temperature (about 25° C.).

The present invention can detect the infrared light with a high sensitivity even under such a condition that the temperature difference (difference between temperature of the piezoelectric substrate 1 of the detector and temperature of the object 8 to be detected) is small and the output frequency change is small.

Figure 2:
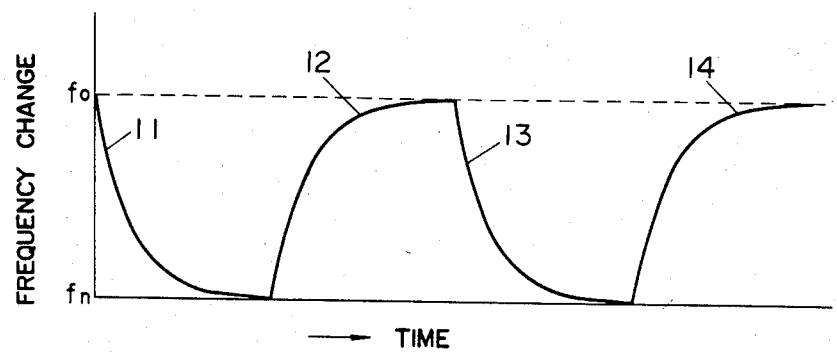
FIG. 2 is a diagram showing the change in oscillation frequency upon opening or closing of a shutter in the infrared detecting unit shown in FIG. 1.

FIG. 2 shows an excursion of changes in frequency when the presence or absence of the irradiation of infrared light occurs in response to the opening or closing of the shutter 9 in the infrared detector shown in FIG. 1. In the figure, curves 11 and 13 represent a change of the oscillation frequency upon opening of the shutter 9, and curves 12 and 14 represent a frequency change upon closure of the shutter. Designated by $f_0$ is the oscillation frequency of the oscillator 7 when the shutter 9 remains closed, and $f_n$ designates a minimum value when the oscillation frequency changes (decreases) under a condition that the shutter 9 remains opened. More specifically, when denoting the time by t, the oscillator 7 oscillates at the frequency $f_0$ for $t<0$ and upon opening of the shutter at $t=0$, the piezoelectric substrate 1 is irradiated with infrared light and the temperature of the piezoelectric substrate 1 rises correspondingly so that the elastic constants change to gradually decrease the oscillation frequency until the ultimate $f_n$. An excursion of this decrease in frequency is depicted by the curve 11. Then, when the shutter 9 is again closed, the irradiation of the infrared light on the piezoelectric substrate 1 is prevented to decrease the temperature of the piezoelectric substrate 1 so that the elastic constants so change as to return the oscillation frequency to $f_0$. This excursion is depicted by the curve 12. Similarly, the curves 13 and 14 are repeated. In this case, assuming that the peak of output waveform from the oscillator 7 is calculated and that the shutter 9 is kept opening or closing until the number of the peaks reaches a predetermined value, the oscillation frequency of the oscillator 7 becomes slightly lower upon opening of the shutter 9 than upon closure thereof and therefore, in comparing the opening period with the closing period of the shutter 9, the opening period becomes slightly longer than the closing period. For example, it was proven by experiments that when the object at 100° C. was distant 7 cm from the surface of the piezoelectric substrate 1, the oscillation frequency of $f_0=171$ MHz during closure of the shutter 9 was decreased by 300 Hz upon opening of the shutter 9. Accordingly, the opening period of the shutter 9 is multiplied by $f_0/f_n = 171000000/170999700$ to become slightly so longer than the closing period. Then, pulse signals from a separate clock pulse signal generator means are counted during an open gate period corresponding to the shutter opening period and during a close gate period corresponding to the shutter closing period. In the previous example, when the number of the peaks of the oscillation waveform is set to $342 \times 10^6$, the closing period of the shutter 9 measures $342 \times 10^6/171 \times 10^6 = 2$ seconds and the opening period measures $342 \times 10^6/170.9997 \times 10^6 = 2.000004$ seconds. Accordingly, by using clock pulses at 500 MHz, a number of pulses amounting to $500 \times 10^6 \times 4 \times 10^{-6} = 2000$ are counted within a time difference of $4 \times 10^{-6}$ seconds between the opening period and the closing period, thereby providing a counting value of 2000 counts. In this manner, according to the present invention, a large count value can be obtained within the slight time difference between the shutter opening period in the presence of the irradiation of infrared light and the closing period in the absence of the irradiation, thereby making it possible to increase sensitivity drastically.

Further, when a difference signal between the oscillation signal of the oscillator 7 and an oscillation signal of another oscillator (which may be a reference oscillator of the same construction as that of the oscillator 7 or an oscillator of another type) is used as the output signal for opening or closing the shutter (which is 1 MHz when the oscillator 7 is at 171 MHz and the remaining oscillator is at 170 MHz), the ratio between the shutter opening and closing periods measures 1 MHz/(1 MHz$-$300 Hz)$=10^6/999700$ since the frequency difference, 300 Hz, between the frequencies in the presence and in the absence of the irradiation of the infrared light remains unchanged. The thus obtained ratio is larger than $171 \times 10^6/170.9997 \times 10^6$ previously obtained to ensure that the detection sensitivity can further be increased. In this case, if, as the remaining oscillator, a reference oscillator which is not irradiated with infrared light is used, having the same construction as the oscillator of FIG. 1, the oscillation frequency difference from the oscillator 7 will be further decreased to thereby improve detection sensitivity as described previously. In addition, since the oscillator 7 and the reference oscillator undergo the same changes in oscillation frequency due to changes in ambient temperature, the oscillation frequency changes are subtracted from each other to provide a construction which is free from the influence of the ambient temperature. In other words, it is possible to construct an infrared detector free from temperature drifts.

Figure 3:
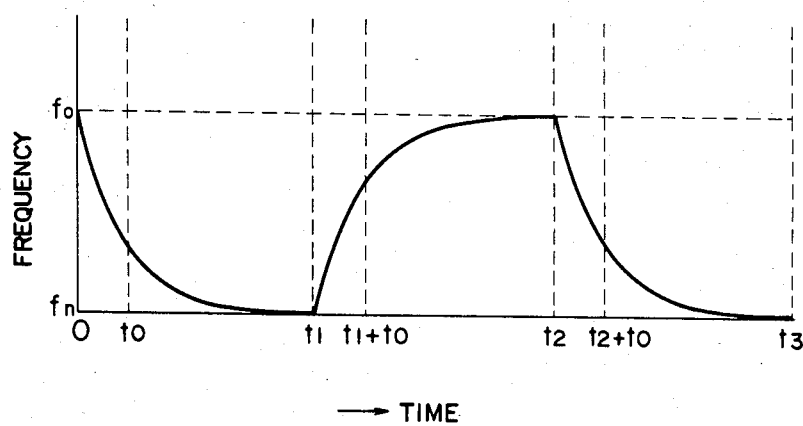
FIG. 3 is a diagram for explaining timings for the opening or closing of the shutter and counting of clock pulses in the infrared detecting unit shown in FIG. 1.

FIG. 3 is a diagram for explaining an example wherein the shutter opening or closing period and the clock pulse counting gate period are shifted by certain time intervals, where the abscissa represents time and the ordinate represents frequency. In the previous example, when the shutter 9 is opened, the peak of the output waveform (which may be from only the oscillator 7 or the difference frequency output between the oscillator 7 and the reference oscillator as mentioned previously, preferably, the latter output) is counted until the counting reaches a predetermined value at time $t_1$ at which the shutter is closed, and the counting resumes. In the example to be described herein, the shutter is set to be opened from $t=0$ to $t=t_1$, closed from $t=t_1$ to $t=t_2$ and opened from $t=t_2$ to $t=t_3$ as in the preceding example whereas the timing for counting the clock pulses generated from the clock pulse generator means is shifted by $t_0$ as shown in FIG. 3. More particularly, an interval from $t=t_0$ to $t=t_1+t_0$ corresponds to a clock pulse counting interval during the shutter opening, and an interval from $t=t_1+t_0$ to $t=t_2+t_0$ corresponds to a clock pulse counting interval during the shutter closing. With this construction, a difference between clock pulse counting periods due to the time-varying oscillator output (the output of the oscillator 7 or the difference output between the oscillator 7 and the reference oscillator) can be further increased and as a result, detection sensitivity can be increased. Experimental results showed that when the timing was shifted by about 0.05 to 0.7 second, sensitivity was maximized although the results had dependency on the construction of the detector. In the experiment, a piezoelectric substrate 1 of lithium niobate was used, the oscillation frequency was 171 MHz, the spacing between the elastic wave transmission and reception interdigital electrodes 2 and 3 was about 2.5 mm, and time $t_1$ shown in FIG. 3 was 1 to 2 seconds.

Figure 4:
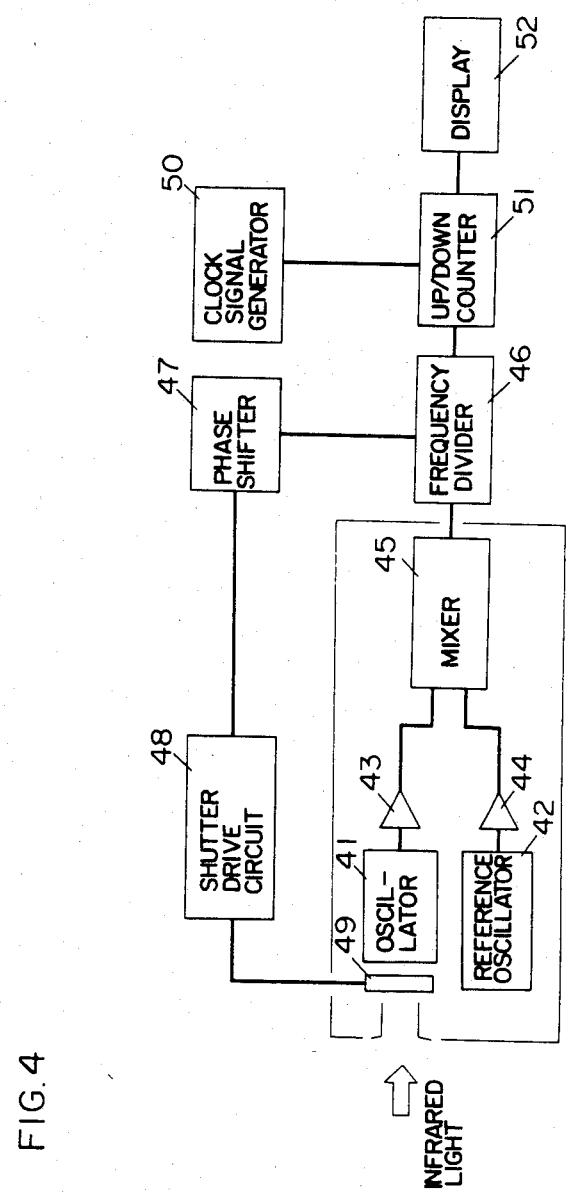
FIG. 4 is a block diagram for processing signals from the infrared detecting unit shown in FIG. 1.

FIG. 4 shows an example of a specified block diagram for practising the above-described function. The oscillator 7 of FIG. 1 is depicted at numeral 41 and at the same time, a reference oscillator 42 for elimination of the influence of room temperature drifts which are not due to irradiation with infrared light is disposed near the oscillator 41. Outputs of the oscillators 41 and 42 are applied to a mixer 45 via buffer circuits 43 and 44, respectively, and a difference frequency between the oscillation frequencies of the oscillators 41 and 42 is delivered out of the mixer 45. The output of the mixer 45 is applied to a frequency divider 46 for prescribing the timing for the clock pulse counting. The output of the frequency divider 46 is applied to a phase shifter 47 for generation of the timing for opening or closing the shutter, and a signal advanced in phase by 0.05 to 0.7 second is applied to a shutter drive circuit 48 which produces an output for driving the shutter 49. On the other hand, a clock signal generator 50 is provided which acts on an up/down counter 51 driven by the signal from the frequency divider 46. The up/down counter responsive to the signal from the frequency divider 46, that is, the shutter opening or closing signal shifted in timing to count clock pulses. An output of the up/down counter 51 is indicated on a display 52. This indication is representative of an infrared detection output.

Figure 5:
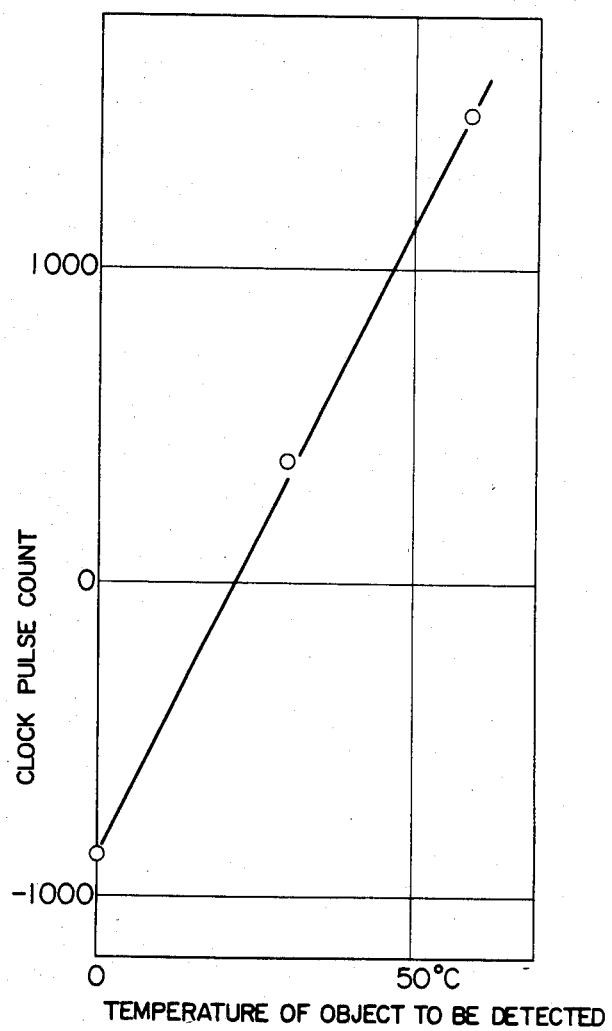
FIG. 5 is a diagram showing the relation between the temperature of an object to be detected and clock pulse count, obtained from the high-sensitivity infrared detector of the present invention.

FIG. 5 shows an example of the relation between the temperature of an object to be detected and the clock pulse count value obtained with the construction of the FIG. 4 block diagram. In FIG. 5, the clock pulse count value is referenced to room temperature. According to the figure, sensitivity measured about 40 counts/° C. and in comparison with results obtained from the mere single detector 7 shown in FIG. 1, the sensitivity was increased by about ten times. Of course, if the present invention employs an optical system, for example, a lens system or a Cassegrain type reflection system for the purpose of focusing the infrared light, the sensitivity may further be improved.

Figure 6:
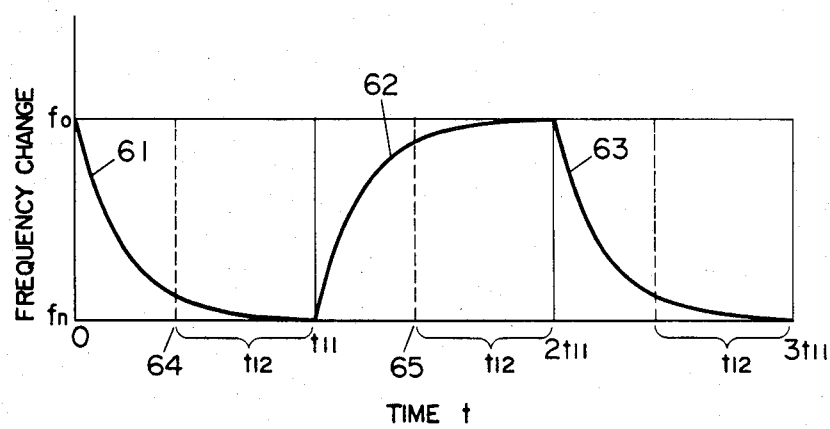
FIG. 6 is a diagram for explaining the principle of the infrared detector according to the present invention.

FIG. 6 shows an excursion of frequency changes when infrared light is irradiated intermittently. In the figure, curves 61 and 63 represent a change in oscillation frequency upon opening of the shutter, and a curve 62 represents a frequency change upon closure of the shutter. The frequency $f_0$ is 171 MHz, the frequency $f_n$ is a minimum value when the oscillation frequency changes (decreases) upon opening of the shutter, and $t_1$ represents the time interval between opening and closing of the shutter. More particularly, for $t<0$, the oscillator 7 of FIG. 1 is oscillating at $f_0$, i.e, a frequency of 171 MHz. When the shutter is opened at $t=0$, the piezoelectric substrate 1 is irradiated with the infrared light and the oscillator 5 gradually decreases its oscillation frequency. At $t=t_{17}$, the oscillation frequency changes from the initial value by $(f_0-f_n)$. An excursion of the attenuation of oscillation frequency is depicted by the curve 61. When the shutter is closed at $t=t_{11}$, the irradiation of infrared light on the piezoelectric substrate 1 is prevented and the oscillation frequency again increases to $f_0=171$ MHz as indicated by the curve 62. When the shutter is reopened at $t=2t_{11}$, the oscillation frequency decreases as in the preceding case, tracing the curve 63. This process is repeated. Then, a difference between a pulsating signal of the oscillation output signal from the oscillator 7 occurring only during an interval ranging from a time 64 preceding by a time $t_{12}$ with respect to a time $t_{11}$ at which the shutter is closed to a time $t_{11}$ and a pulsating signal of the oscillation output signal occurring only during an interval ranging from a time 65 preceding by time $t_{12}$ with respect to a time $2t_{11}$ at which the shutter is opened to the time $2t_{11}$ is measured by the up/down counter. A count signal thus obtained (the difference between the above two signals) changes with temperatures of the object radiating the infrared light. Conversely, it is possible to measure the temperature of the object which is desired to be measured by measuring the count signal.

Figure 7:
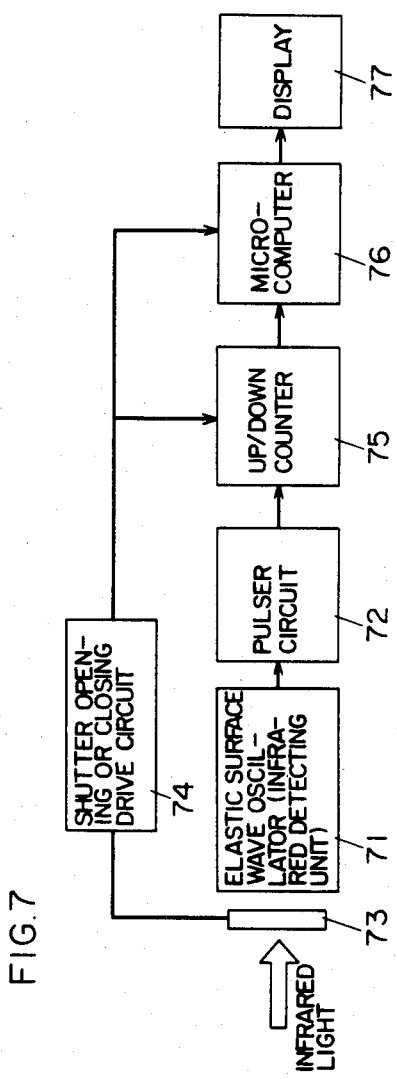
FIGS. 7 and 8 are block diagrams showing constructions of specified examples of the infrared detector according to the present invention.

FIG. 7 shows an example of the construction of the infrared detector according to the present invention. In the figure, numeral 71 denotes an elastic surface wave oscillator (infrared detecting unit) 7 shown in FIG. 1. An output of the oscillator 71 is directed to a pulser circuit 72 so as to be formed into pulses. On the other hand, radiation infrared light from an object to be measured in front of the oscillator (infrared detecting unit) 71 is made incident thereto and a shutter 73 is disposed in the way. The shutter 73 is driven by a shutter opening or closing drive circuit 74. An output of the pulser circuit 72 is inputted to an up/down counter 75 which is responsive to timing signals from the shutter opening or closing drive circuit 74 (such as $t_{11}$, $2t_{11}$, $3t_{11}$, 64 and 65 in FIG. 6) to count the output pulses from the pulser circuit 32. This up/down counter 75 measures the difference between the pulse signals within the interval from 65 to $2t_{11}$ (the number of output pulses during the closing period) and the pulse signals within the interval from 64 to $t_{11}$ (the number of output pulses during the opening period). A measured output is directed to a microcomputer 76 and indicated on a display 77. The microcomputer 76 may be supplied with the timing signal from the shutter opening or closing drive circuit 74. With the timing signal inputted, the microcomputer 76 stores time variations in the measured number of the output pulses from the up/down counter 75 which in turn may be used for various types of controlling. In an application to a foodstuff heating cooker, for example, temperature of foodstuffs is detected by the detector 71, time variations in the number of output pulses are measured by the microcomputer, and heating is stopped when the pulse number reaches a predetermined value.

Figure 8:
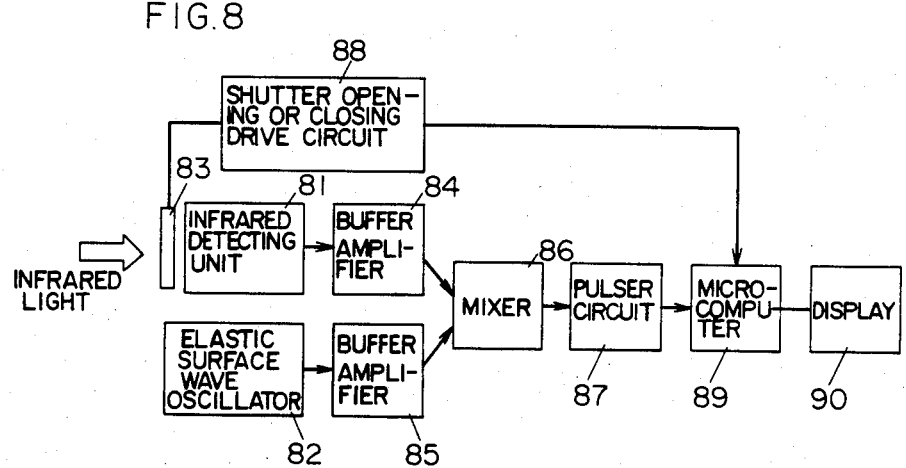

FIG. 8 shows an improvement in the above-described infrared (temperature) detector having a construction wherein changes in the oscillation output frequency due to temperature rise in the detector itself can be prevented. In FIG. 8, numeral 81 designates an infrared detecting unit, and 82 an oscillator having the same construction (both the detecting unit and oscillator having the same construction as the unit 7 in FIG. 1). Infrared light is incident on the detecting unit 81 through a shutter 83, and the oscillator 82 is adapted to eliminate variations due to ambient temperature. Output signals from the detecting unit 81 and the oscillator 82 are applied to a mixer 86 via buffer amplifiers 84 and 85, respectively. The buffer amplifiers 84 and 85 are not always necessary. In the mixer 86, a frequency difference signal between the output signals of the detecting unit 81 and the oscillator 82 is derived. The detecting unit 81 and the oscillator 82 having the same essential construction provide substantially the same frequency signals. Therefore, the output signal frequency of the mixer 86 has a much lower frequency than the output frequencies of the detecting unit 81 and the oscillator 82. According to experiments, the output frequencies of the detecting unit 81 and oscillator 82 were about 171 MHz and the output frequency of the mixer 86 was about 130 KHz. The output of the mixer 86 is converted into pulse signals by a pulser circuit 87. On the other hand, the shutter 83 is driven by a shutter opening or closing drive circuit 88. At the same time, a microcomputer 89, including an up/down counter responsive to the timing signals from the drive circuit 88 (such as $t_{11}$, $2t_{11}$, $3t_{11}$, 64 and 65 mentioned previously) to count the pulse signals from the pulser circuit 87, monitors the output of the pulser circuit 87. Conversely, the drive circuit 88 may be controlled by a command from the microcomputer 89. A pulse number counted by the microcomputer 89 is indicated on a display 90. Alternatively, as in the example of cooker described previously, the microcomputer may control the heating mechanism.

In the experiments described with reference to FIGS. 7 and 8, $t_{11}$, the interval from 64 to $t_{11}$ and the interval from 65 to $2t_{11}$ in FIG. 6 were about 2 seconds, about 1 second and about 1 second, respectively.

Figure 9:
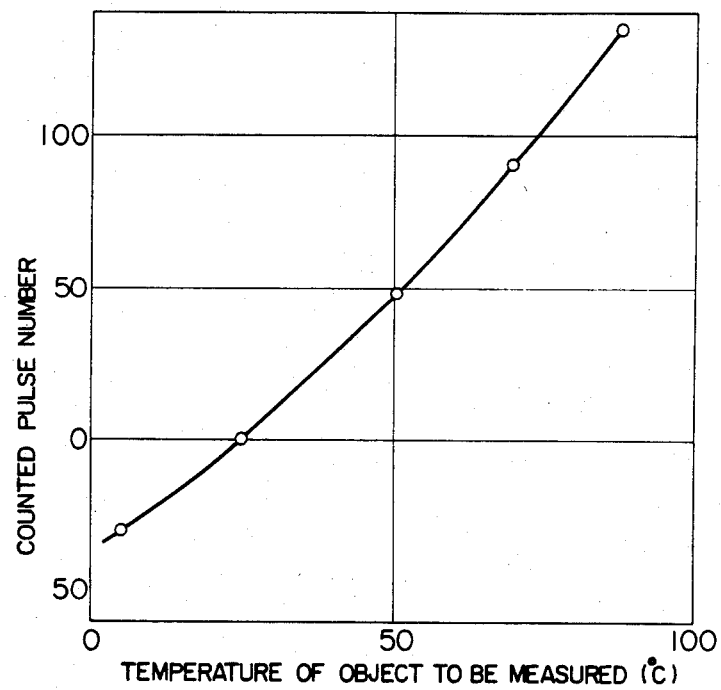
FIG. 9 is a diagram showing an example of the relation between the temperature of the object being detected and the output.

FIG. 9 shows an excursion of changes in the counted pulse number with respect to temperature changes of an object to be measured.

Figure 10:
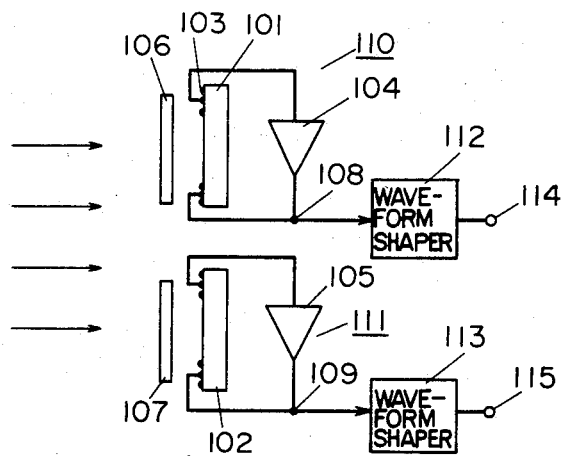
FIG. 10 is a block diagram showing another specified example of the infrared detector according to the present invention.

FIG. 10 shows another example of the construction of the infrared detector according to the present invention. In the figure, numerals 101 and 102 denote piezoelectric substrates. On surfaces of these substrates 101 and 102 are disposed interdigital electrodes (for example, 103) as shown at 2 and 3 in FIG. 1. These interdigital electrodes are connected to amplifiers 104 and 105, thereby constituting such infrared detectors 110 and 111 as shown in FIG. 1. Shutters 106 and 107 are disposed in front of the piezoelectric substrates 101 and 102, respectively, and switch incident infrared light (depicted by arrows). In FIG. 10, two infrared detectors are provided, and the switching phases of the shutters 106 and 107 are 180° out of phase from each other. In other words, the opening and closing of the shutters 106 and 107 are inverted with respect to each other. Outputs 108 and 109 of these infrared detectors 110 and 111 are applied to waveform shapers 112 and 113 and delivered to output terminals 114 and 115. The output waveforms are shaped into pulse waveforms, which are delivered at the output terminals 114 and 115. In accordance with changes in the output frequencies from the detectors 110 and 111, the number of pulses from the output terminals 114 and 115 changes. Therefore, the peaks of the output frequencies may be used as pulses.

Figure 11:
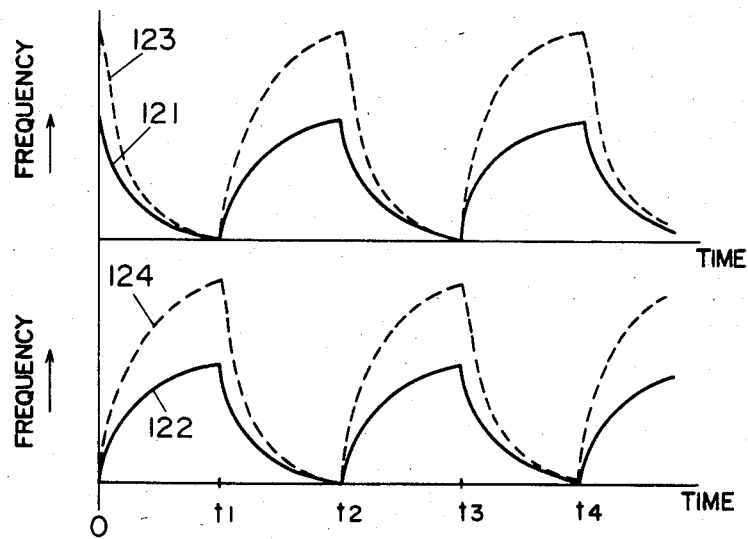
FIG. 11 is a diagram for explaining the operation of the example shown in FIG. 10.

FIG. 11 shows frequency changes in the outputs 108 and 109 from the infrared detectors 110 and 111 shown in FIG. 10. Curves 121 and 122 represent frequency changes of the outputs 108 and 109, respectively. Within an interval from 0 to $t_1$, the shutter 106 is opened and the shutter 107 is closed. When the shutter 106 is opened, infrared light irradiates on the substrate 101 and the output frequency of the detector 110 decreases. An attenuation curve at this time approximates an exponential curve. During this interval, the shutter 107 is closed and the irradiation of infrared light on the element 102 is prevented to thereby increase the output frequency of the detector 111. The rising curve at this time also approximates an exponential curve. Subsequently, within an interval from $t_1$ to $t_2$, the shutter 106 is inverted to close and the shutter 107 is inverted to open, establishing curves as illustrated. Similar operations are repeated through an interval from $t_2$ to $t_3$ and an interval from $t_3$ to $t_4$. Under the operations, infrared energy from the object (not shown) is measured to determine the temperature of the object. The higher the object temperature, that is, the higher the infrared radiation energy, the more the amount of frequency change caused by switching the shutters increases. Thus, the heights of the curves in FIG. 11 are increased in the ordinate direction so that curves 121 and 122 coincide with curves 123 and 124, respectively. In accordance with the increased heights, the change in the number of pulses from the output terminals 114 and 115 of FIG. 10 is also increased. Accordingly, it is possible to determine the temperature (dosage of infrared light) of the object by measuring the difference between the frequency (pulse number) during the shutter closing and the frequency (pulse number) during the shutter opening.

In the above operation, if only one infrared detector (for example, 110) is used, the time interval covering the shutter opening and closing periods (from $t_1$ to $t_3$ in FIG. 11) will be required for one measurement. However, as shown in FIG. 3, two detectors, for example, permit alternate switching of the shutters and the time required for one measurement can be halved, amounting to $t_1$. Consequently, response speed can be increased. One measurement method is available wherein measurement is effected for the curve 121 in FIG. 11 during an interval from 0 to $t_2$ and an interval from $t_2$ to $t_4$ and at the same time, measurement is effected for the curve 122 during an interval from $t_1$ to $t_3$ and an interval from $t_3$ to $t_5$. Another measurement method is available wherein measurement is effected for both the curves 121 and 122 during an interval from 0 to $t_1$ and an interval from $t_1$ to $t_2$. The pulse outputs from the output terminals 114 and 115 in FIG. 10 may be inputted to the microcomputer and processed in the form of digital signals by varying the pulse outputs in synchronism with the shutter opening and closing times.

FIG. 12 shows another example of the construction of the present invention. In the figure, components designated by 101 to 109 are the same as the corresponding components in FIG. 10. Detectors are also designated by numerals 110 and 111. In FIG. 12, a reference detector 130 is added. The reference detector 130 has substantially the same construction as the infrared detector 110 or 111 but it has a construction which is not irradiated with infrared light. More specifically, an interdigital electrode 132 is disposed on the surface of a piezoelectric element 131 and connected to an amplifier 133, thereby constituting a feedback type oscillator. The element 131 is provided with a cover 134 for prevention of infrared light irradiation from the outside, and an output at a predetermined frequency is delivered to an output terminal 135. Three elements 101, 102 and 131 are thermally interconnected so as to be equally affected by ambient temperature changes. Output signals from the output terminals 108 and 109 are mixed with a signal from the output terminal 135 at mixers 136 and 137 and led to output terminals 138 and 139, respectively. The output signal at the output terminal 138 corresponds to a difference frequency between the output frequencies of the detectors 110 and 130, and the output signal at the output terminal 139 corresponds to a difference frequency between the output frequencies of the detectors 111 and 130. In other words, a signal at the output terminal 138 is a signal representative of a difference frequency between frequencies of the output signals of the detectors 110 and 130. In addition, the signals at the output terminals 138 and 139 are compensated against ambient temperature to have extremely stable frequencies. Further, the output signals can advantageously have low frequencies suitable for handling in an ordinary microcomputer. Although not shown, a double heterodyne system may obviously be applied to the output terminals 138 and 139 so as to further lower the frequencies, thereby permitting an advantageous application to an inexpensive and low-speed microcomputer.

FIG. 13 shows an example of actually measured output waveform at the output terminal 138 in FIG. 12 under a condition that the temperature of the object to be measured was 60° C. and room temperature was 25° C.

INDUSTRIAL APPLICABILITY

As described above, in an infrared detector according to the present invention, a shutter is employed in an elastic wave element of a feedback type oscillator containing the elastic element so that it emits infrared light intermittently. The period or interval during which the number of peaks of the oscillation output waveform from the feedback type oscillator reaches a predetermined value is set to be the opening or closing period of the shutter, the number of clock pulses from a clock signal generator is counted during the period the shutter is opening or closing, and the difference between the counted values is obtained, thereby detecting the energy of the infrared light. This detector features not only an extremely high sensitivity, but a high detection accuracy, as well as the production of a digital output.

The shutter was a mechanical one including such a shutter mechanism as a moving-coil type and a moving-iron type. In addition, a shutter was used which was magnetically actuated.

Furthermore, in the infrared detector according to the present invention, the feedback type oscillator is constituted by the elastic wave element and the amplifier, the infrared light is irradiated on the elastic wave element intermittently by means of the shutter, and the difference between the numbers of pulses corresponding to frequencies of respective signals each of which occurs during an interval between a time preceding by a predetermined period with respect to an opening or closing time of the shutter and the opening or closing time, that is, the difference between output pulse number during the shutter opening period and output pulse number during the shutter closing period is measured to measure the temperature of the object being measured. Thus, this infrared detector features extremely high detection sensitivity and excellent noise-proof properties because of the output in the form of pulses. Since the frequency change corresponds to the infrared-ray energy, the temperature of the object being measured can be measured without touching the object. Further, high sensitivity can be ensured by setting the pulse counting period subject to the opening or closing of the shutter to a suitable value conformable to thermal time constants of the elastic wave element.

Moreover, in the infrared detector according to the present invention, at least two or more feedback type oscillators utilizing elastic surface wave elements are used, the infrared light is irradiated on the elastic surface wave elements to produce the output representative of the oscillation frequency change of the oscillator corresponding to slight temperature changes of the elements, the irradiation of the infrared light on the elements is effected intermittently by opening or closing shutters disposed in front of the elements in such a manner that the opening and closing phases of the shutters are shifted with respect to each other, the peaks (pulses) of the output waveforms from the oscillators are counted, and the difference between pulse number during the opening period and pulse number during the closing period of the shutters is measured to continuously detect the infrared ray energy. Of course, if the present invention employs an optical system, for example, a lens system or a Cassegrain type reflection system for the purpose of focussing the infrared light, the sensitivity may further be improved.

We claim:

1. An infrared detector comprising an infrared detecting unit having a feedback type oscillator comprised of an elastic surface wave element and an amplifier, a shutter for intermittent irradiation of infrared light on said elastic surface wave element, and a counter for counting the number of output pulses occurring from said infrared detecting unit during an opening period within an interval between a time preceding a predetermined time with respect to an opening or closing time of said shutter and the opening time and counting the number of output pulses occurring from said infrared detecting unit during the closing period within an interval between said preceding time and said closing time, whereby a difference between the output pulse number during the opening period and the output pulse number during the closing period is counted by said counter to measure and detect the infrared light irradiated on said elastic surface wave element or temperature of an object emitting the infrared light.

2. An infrared detector according to claim 1 comprising at least two sets of the feedback type oscillator comprised of the elastic surface wave element and the amplifier and at least two sets of the shutter, whereby temperature changes of the output frequency of one feedback type oscillator serving as the infrared detecting unit are compensated by the oscillation frequency of the other feedback type oscillator.

3. An infrared detector according to claim 2 wherein the shutters arranged respectively in association with said at least two feedback type oscillators are switched in such a manner that one shutter is opened with the other shutter closed.

* * * * *